(12) United States Patent
Lin et al.

(10) Patent No.: US 9,958,764 B2
(45) Date of Patent: May 1, 2018

(54) PROJECTOR

(71) Applicants: Sintai Optical (Shenzhen) Co., Ltd., ShenZhen, Guangdong Province (CN); Asia Optical Co., Inc., Taichung (TW)

(72) Inventors: Keng-Hui Lin, Taichung (TW); Chih-Peng Wang, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days. days.

(21) Appl. No.: 15/473,718

(22) Filed: Mar. 30, 2017

(65) Prior Publication Data
US 2017/0293213 A1 Oct. 12, 2017

(30) Foreign Application Priority Data
Apr. 8, 2016 (CN) .......................... 2016 1 0216955

(51) Int. Cl.
| | | |
|---|---|---|
| G03B 21/14 | (2006.01) | |
| H04N 9/31 | (2006.01) | |
| G02B 27/28 | (2006.01) | |
| G03B 21/20 | (2006.01) | |
| G02B 5/30 | (2006.01) | |
| G02B 27/14 | (2006.01) | |

(52) U.S. Cl.
CPC ....... *G03B 21/2073* (2013.01); *G02B 5/3083* (2013.01); *G02B 27/149* (2013.01); *G02B 27/283* (2013.01); *G03B 21/142* (2013.01); *H04N 9/3197* (2013.01)

(58) Field of Classification Search
CPC .. G03B 21/14; G03B 21/142; G03B 21/2073; G02B 27/28
See application file for complete search history.

(56) References Cited

U.S. PATENT DOCUMENTS

| | | | | |
|---|---|---|---|---|
| 5,975,704 A | * | 11/1999 | Basey | .................. H04N 9/3185 348/E5.137 |
| 7,712,902 B2 | * | 5/2010 | Nakamura | ............... G03B 9/02 349/5 |

* cited by examiner

*Primary Examiner* — William C Dowling
(74) *Attorney, Agent, or Firm* — McClure, Qualey & Rodack, LLP

(57) ABSTRACT

A projector includes a polarization changing mechanism and a polarized beam splitter. The polarization changing mechanism is movable. A first polarized beam is configured to pass or not pass through the polarization changing mechanism. The first polarized beam transforms into a second polarized beam when the first polarized beam passes through the polarization changing mechanism. The polarized beam splitter has a light splitting surface. The first polarized beam enters the polarized beam splitter and is guided by the light splitting surface to travel in a first direction, when the first polarized beam does not pass through the polarization changing mechanism. The second polarized beam enters the polarized beam splitter and is guided by the light splitting surface to travel in the first direction or a second direction, when the first polarized beam passes through the polarization changing mechanism and transforms into the second polarized beam.

17 Claims, 12 Drawing Sheets

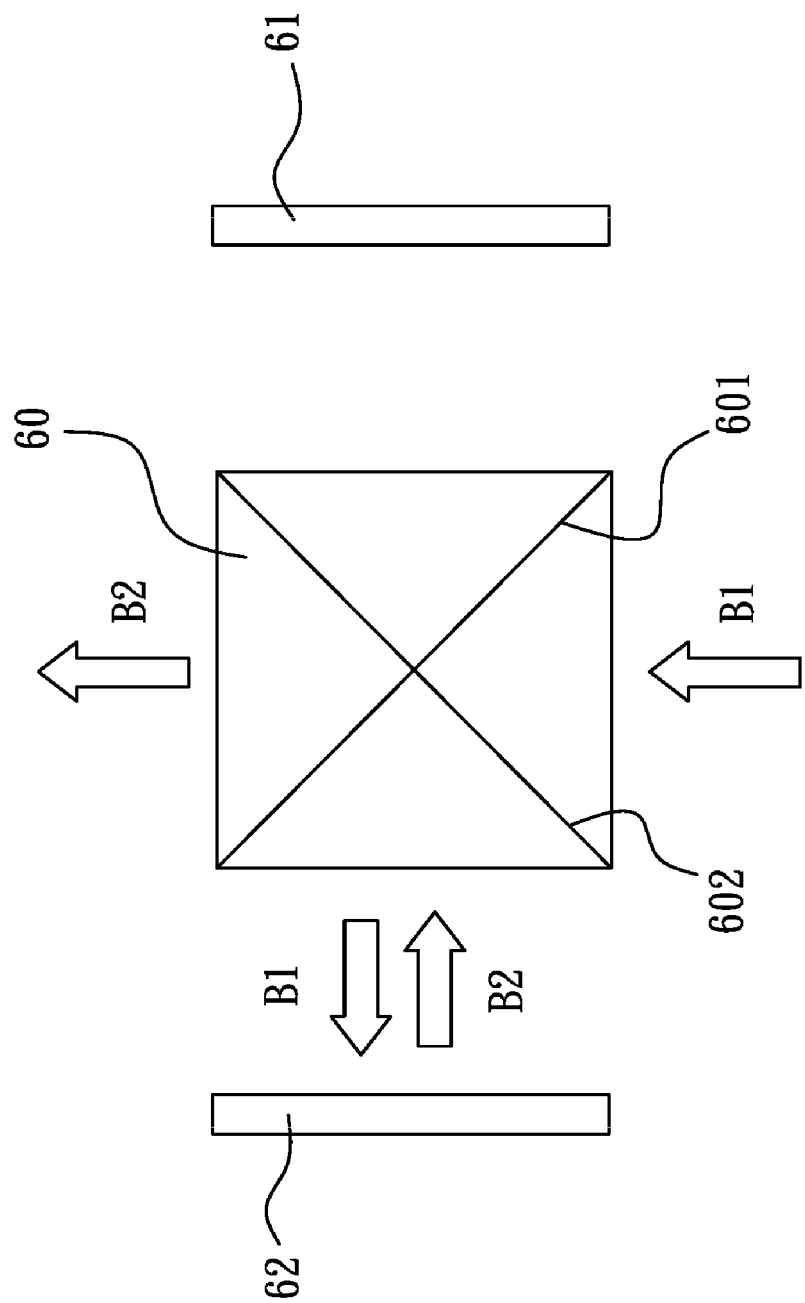

// PROJECTOR

BACKGROUND OF THE INVENTION

Field of the Invention

The invention relates to a projector which is capable of changing the projecting direction, and more particularly to a projector capable of changing the projecting direction through changes of the polarization of a beam and use of a polarized beam splitting element.

Description of the Related Art

FIGS. 1 and 2 depict a prior micro projector. The micro projector 1000 includes a housing 120. A light engine (not shown) is disposed in the housing 120, and a lens 130 is connected to the light engine and disposed beside the housing 120. A light-projection-direction-adjusting mechanism 140 is also disposed beside the housing 120. The light-projection-direction-adjusting mechanism 140 includes a cap body 142, a mirror 144 and a front cover 146. The cap body 142 is hollow and rectangular and is slidably disposed beside the housing 120 to cover the lens 130. The mirror 144 is disposed in the cap body 142. The angle between a normal line of the mirror 144 and an optical axis of the lens 130 is approximately 45 degrees.

The cap body 142 is slidably disposed beside the housing 120 to slide between a first position and a second position. When the cap body 142 is slid to the first position as shown in FIG. 1, light passes through the lens 130 and an opening 1426 to be projected (for example, to be projected onto a projection screen). When the cap body 142 is slid to the second position as shown in FIG. 2, light passes through the lens 130 and is reflected by the mirror 144 to travel perpendicular to an optical axis of the lens 130. That is, the light projection direction of FIG. 2 is changed ninety degrees as compared with that of FIG. 1. In practical application, therefore, the micro projector 1000 is able to project light forwards or upwards to a ceiling or downward to a top of a desk.

As described, the projecting direction of the micro projector 1000 can be changed by sliding the cap body 142 for moving the mirror 144 to the front of the lens 130. However, an additional space to slide the cap body 142 is required for the micro projector 1000, which is disadvantageous for miniaturization of a micro projector, especially for miniaturization of a short throw projector which has a larger reflecting element (such as the mirror 144) and requires a larger space to slide the reflecting element.

BRIEF SUMMARY OF THE INVENTION

The invention provides a projector to address the described problems. The projector includes a polarization changing element configured to change the polarization of a beam, and is able to change the projecting direction by introducing the beam to polarized beam splitting elements which can be rotated with respect to each other, rotated via a shaft, or moved out of the traveling path of the polarized beams.

The projector in accordance with an embodiment of the invention includes a light engine, a polarization changing mechanism and a polarized beam splitter. The light engine is configured to generate a first polarized beam. The polarization changing mechanism is movable. The first polarized beam is configured to pass or not pass through the polarization changing mechanism. The first polarized beam transforms into a second polarized beam when the first polarized beam passes through the polarization changing mechanism. The polarized beam splitter has a light splitting surface. The first polarized beam enters the polarized beam splitter and is guided by the light splitting surface to travel in a first direction, when the first polarized beam does not pass through the polarization changing mechanism. The second polarized beam enters the polarized beam splitter and is guided by the light splitting surface to travel in the first direction or a second direction, when the first polarized beam passes through the polarization changing mechanism and transforms into the second polarized beam.

In another embodiment, the second polarized beam entering the polarized beam splitter is split on the light splitting surface to travel respectively in the first and second directions.

In another embodiment, the polarization changing mechanism includes a first quarter wavelength plate and a second quarter wavelength plate, the first polarized beam transforms into the second polarized beam when the first polarized beam passes through the first quarter wavelength plate and the second quarter wavelength plate in order, and the first quarter wavelength plate and the second quarter wavelength plate are rotatable relative to each other.

In another embodiment, the first quarter wavelength plate has a first transmission axis, the second quarter wavelength plate has a second transmission axis, a first angle between the first transmission axis and a polarization direction of the first polarized beam is 45 degrees, and a second angle between the first transmission axis and the second transmission axis is 0 degrees, 22.5 degrees, 45 degrees or 180 degrees.

In another embodiment, the polarization changing mechanism includes a half wavelength plate which is movable relative to the light engine and the polarized beam splitter, the first polarized beam transforms into the second polarized beam when the first polarized beam passes through the half wavelength plate, and the first polarized beam enters the polarized beam splitter when the first polarized beam does not pass through the half wavelength plate.

In another embodiment, the polarization changing mechanism includes a half wavelength plate which is rotatable about a shaft, the first polarized beam transforms into the second polarized beam when the first polarized beam passes through the half wavelength plate, and the first polarized beam enters the polarized beam splitter when the first polarized beam does not pass through the half wavelength plate.

In another embodiment, the polarized beam splitter includes a polarized beam splitting prism.

In another embodiment, the light splitting surface is a plane, curved surface or aspherical surface.

In another embodiment, the first direction is perpendicular to the second direction.

In another embodiment, the projector further includes a reflecting prism which has a reflecting surface, wherein either the first polarized beam or the second polarized beam introduced by the light splitting surface into the reflecting prism is reflected by the reflecting surface to travel in a third direction.

In another embodiment, the polarization changing mechanism includes an x-cube and two panels, and the two panels are positioned respectively at nonadjacent sides of the x-cube.

In another embodiment, the x-cube includes two coatings which are arranged in a shape of x, one coating allows a horizontally polarized beam (p-light) to pass through and reflects a vertically polarized beam (s-light), and the other coating allows the vertically polarized beam (s-light) to pass through and reflects the horizontally polarized beam (p-light).

The projector in accordance with another embodiment of the invention includes a light engine, a polarization changing mechanism and a polarized beam splitter. The light engine is configured to generate a first polarized beam. The polarization changing mechanism is movable and includes a first quarter wavelength plate and a second quarter wavelength plate. The first quarter wavelength plate and the second quarter wavelength plate are rotatable relative to each other. The polarized beam splitter has a light splitting surface. The first polarized beam transforms into a second polarized beam when the first polarized beam passes through the first quarter wavelength plate and the second quarter wavelength plate in order. The second polarized beam enters the polarized beam splitter and is guided by the light splitting surface to travel in a first direction or a second direction.

The projector in accordance with yet another embodiment of the invention includes a light engine, a polarization changing mechanism and a polarized beam splitter. The light engine is configured to generate a first polarized beam. The polarization changing mechanism is movable and includes a first quarter wavelength plate having a first transmission axis and a second quarter wavelength plate having a second transmission axis. The polarized beam splitter has a light splitting surface. The first polarized beam transforms into a second polarized beam when the first polarized beam passes through the first quarter wavelength plate and the second quarter wavelength plate in order. A first angle between the first transmission axis and a polarization direction of the first polarized beam is 45 degrees. The second polarized beam enters the polarized beam splitter and is guided by the light splitting surface to travel in a first direction or a second direction when a second angle between the first transmission axis and the second transmission axis is 0 degrees, 22.5 degrees, 45 degrees or 180 degrees.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 9A and 9B depict a polarization changing mechanism in accordance with an embodiment of the invention.

DETAILED DESCRIPTION OF THE INVENTION

Figure 3:
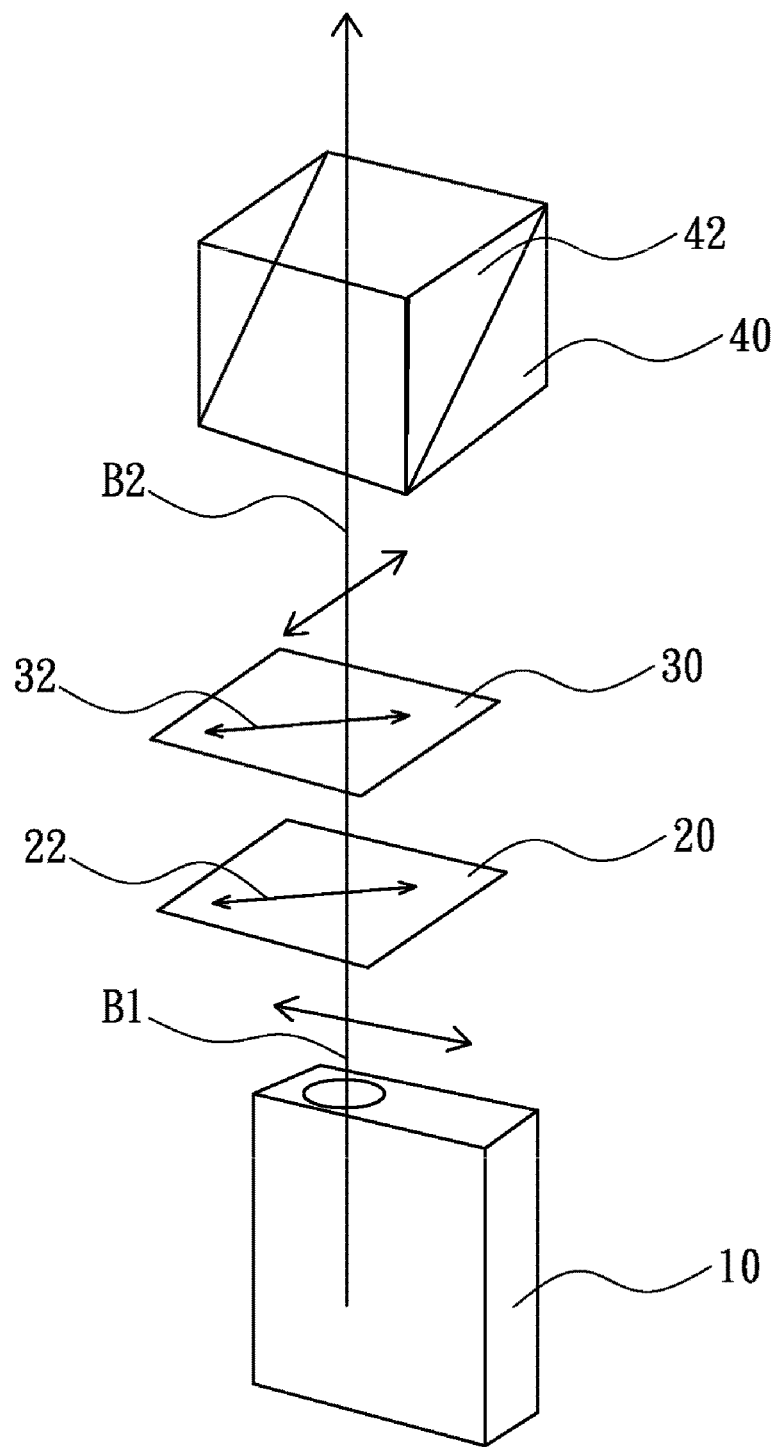
FIGS. 3 and 4 are schematic views of a projector in accordance with an embodiment of the invention.

FIG. 3 illustrates an embodiment of a projector 100 which includes a light engine 10, a polarization changing mechanism and a polarized beam splitter 40. The polarization changing mechanism includes a first quarter wavelength plate 20 and a second quarter wavelength plate 30, wherein the first quarter wavelength plate 20 has a first transmission axis 22, and the second quarter wavelength plate 30 has a second transmission axis 32. The second quarter wavelength plate 30 is rotatable with respect to the first quarter wavelength plate 20. The polarized beam splitter 40 having a light splitting surface 42 is a polarized beam splitting prism. When a beam is incident on the light splitting surface 42, the light splitting surface 42 allows a horizontally polarized beam (p-light) to pass through and reflects a vertically polarized beam (s-light).

As shown in FIG. 3, the light engine 10 is configured to generate a first beam B1. The first beam B1 is a linearly polarized beam, for example, a vertically polarized beam (s-light). The first beam B1 transforms into a second beam B2 when the first beam B1 passes through the first quarter wavelength plate 20 and the second quarter wavelength plate 30 in order. The second beam B2 is a horizontally polarized beam (p-light) when the angle between the first transmission axis 22 of the first quarter wavelength plate 20 and the polarized direction of the first beam B1 is 45 degrees and the second transmission axis 32 is parallel to the first transmission axis 22. The second beam B2 enters the polarized beam splitter 40, passes through the light splitting surface 42, and leaves the polarized beam splitter 40 in a first direction. In other words, the second beam B2 is projected in the first direction.

Figure 1:
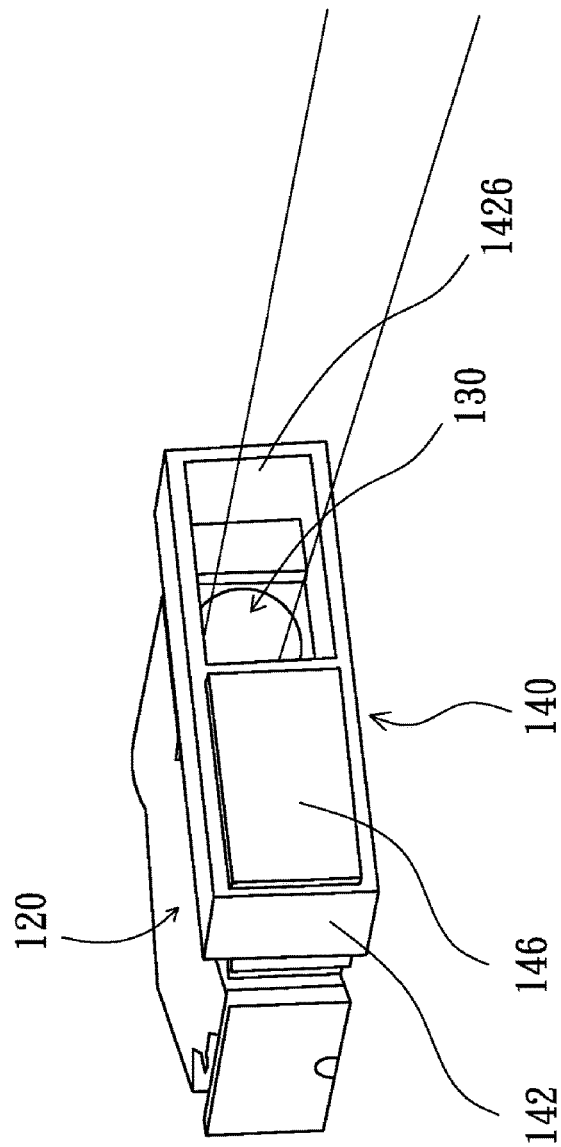
FIGS. 1 and 2 are perspective views of a prior micro projector.
Figure 2:
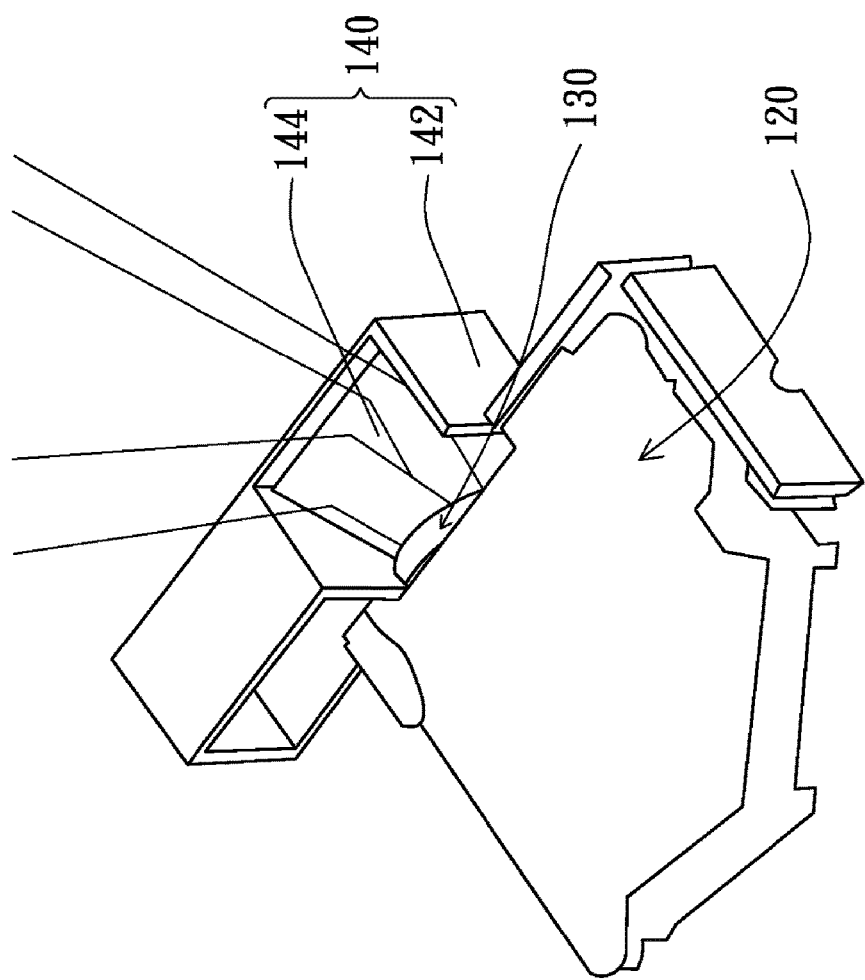
Figure 4:
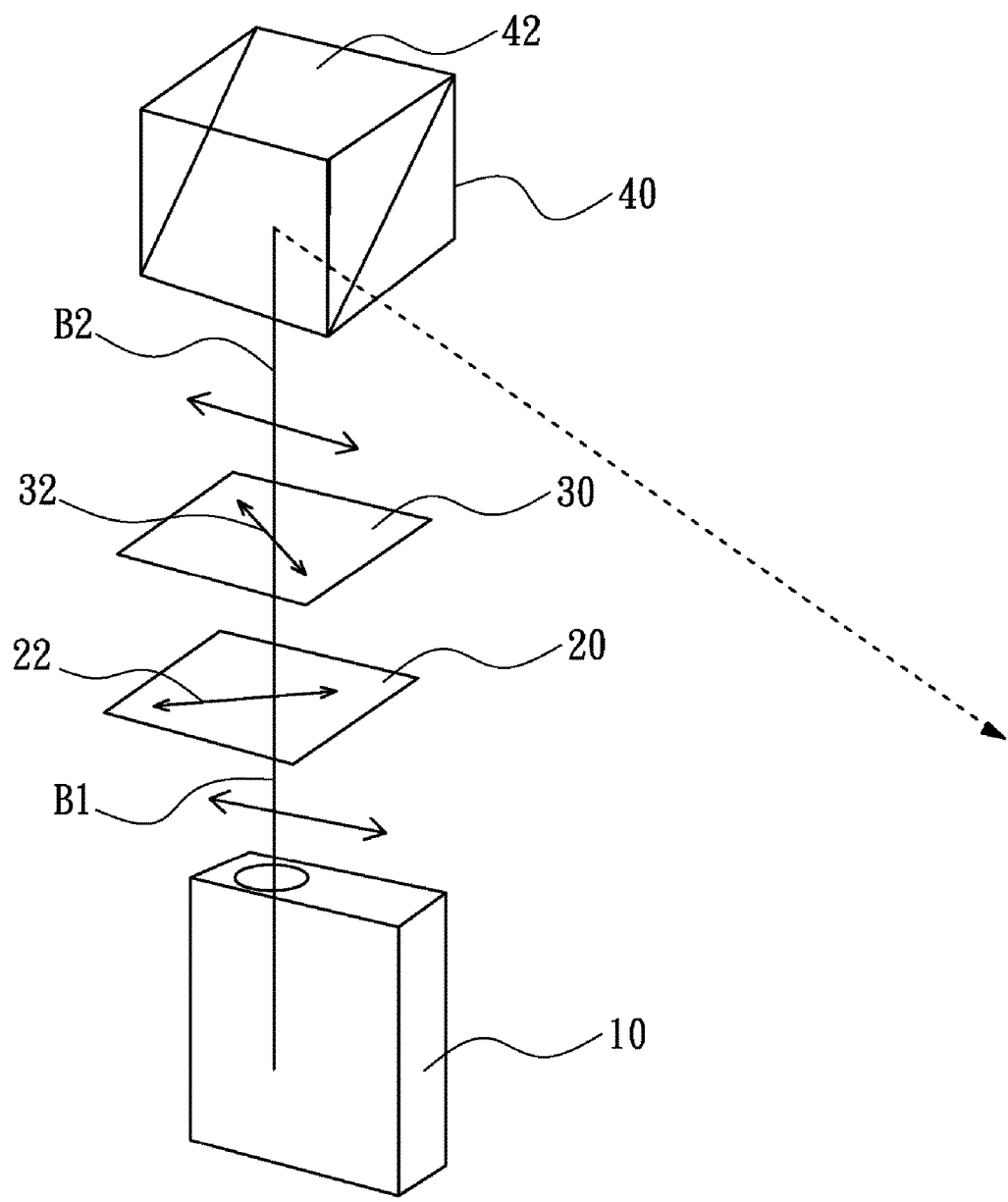

To change the projecting direction, the second quarter wavelength plate 30 is rotated 45 degrees with respect to the first quarter wavelength plate 20 as shown in FIG. 4. The first beam B1 transforms into the second beam B2 when the first beam B1 passes through the first quarter wavelength plate 20 and the second quarter wavelength plate 30 in order. The second beam B2 is a vertically polarized beam (s-light) because the angle between the first transmission axis 22 of the first quarter wavelength plate 20 and the polarized direction of the first beam B1 is 45 degrees and the angle between the second transmission axis 32 and the first transmission axis 22 is 45 degrees. The second beam B2 enters the polarized beam splitter 40, is reflected by the light splitting surface 42 to travel in a second direction, and leaves the polarized beam splitter 40. In other words, the second beam B2 is projected in the second direction. It is therefore understood that the projection direction of the projector 100 can be changed by utilizing the second quarter wavelength plate 30 and the polarized beam splitter 40 wherein the second quarter wavelength plate 30 is rotated to change the polarization of the second beam B2 and the second beam B2 is directed to the polarized beam splitter 40. Because the projecting direction of the projector 100 can be changed by rotating the first quarter wavelength plate 20 and/or the second quarter wavelength plate 30, the projector 100 does not need to provide an additional space for sliding a reflecting element (such as the cap body 142 in FIGS. 1 and 2) and miniaturization of the projector 100 becomes easier.

In another embodiment, the second quarter wavelength plate 30, with the second transmission axis 32 in parallel to the first transmission axis 22, is rotated 22.5 degrees with respect to the first quarter wavelength plate 20. The first beam B1 transforms into the second beam B2 when the first beam B1 passes through the first quarter wavelength plate 20 and the second quarter wavelength plate 30 in order. Because the angle between the first transmission axis 22 of the first quarter wavelength plate 20 and the polarized direction of the first beam B1 is 45 degrees and the angle between the second transmission axis 32 and the first transmission axis 22 is 22.5 degrees, the second beam B2 is formed to be a circularly polarized beam which contains a vertically polarized component (s-light) and a horizontally polarized component (p-light). After entering the polarized beam splitter 40 and reaching the light splitting surface 42, the second beam B2 is split into two polarized beams which respectively travel in the first and second directions. In other words, the two polarized beams are projected simultaneously in the first and second directions.

Figure 5:
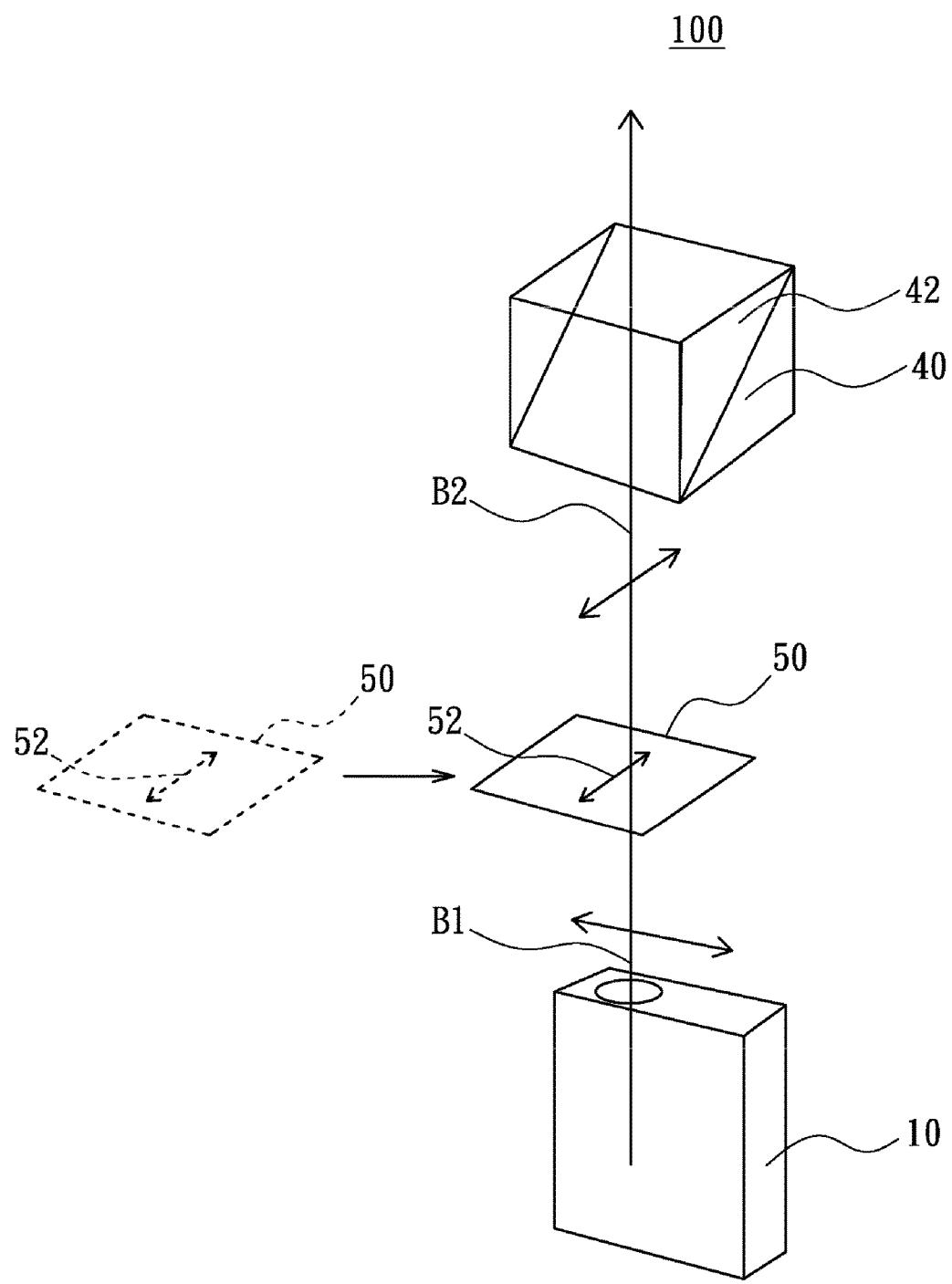
FIGS. 5 and 6 are schematic views of a projector in accordance with another embodiment of the invention.
Figure 6:
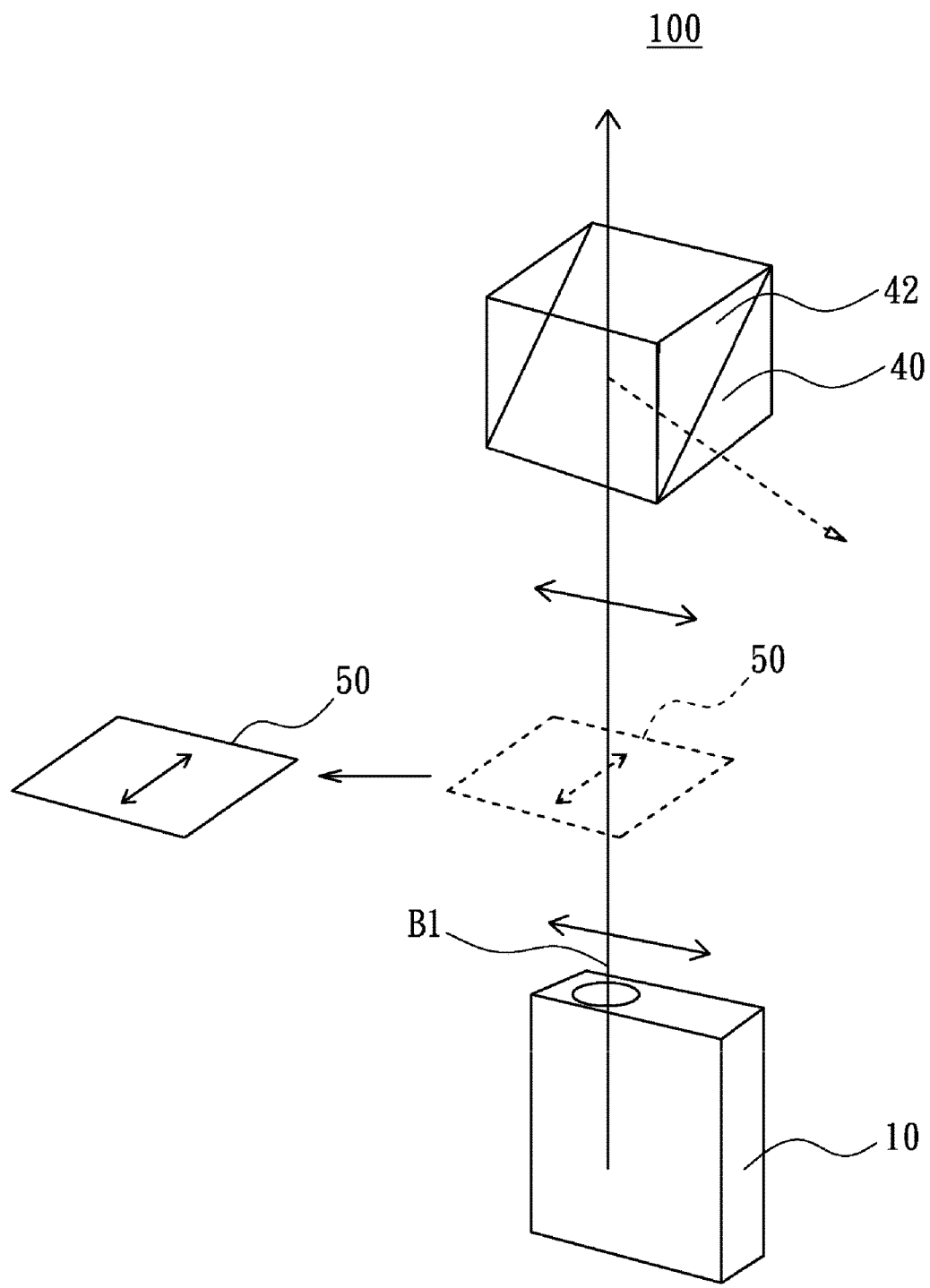

FIGS. 5 and 6 illustrate another embodiment of the projector. The difference between this embodiment and the embodiment of FIGS. 3 and 4 is that the polarization changing mechanism of this embodiment includes a half wavelength plate 50 which is movable. As shown in FIG. 5, the first beam B1 transforms into the second beam B2 which is a horizontally polarized beam (p-light) when the first beam B1 passes through the half wavelength plate 50. The second beam B2 enters the polarized beam splitter 40, passes through the light splitting surface 42 and travels in the first direction. FIG. 6 illustrates the half wavelength plate 50 moved away from the traveling path of the first beam B1, wherein the first beam B1 directly enters the polarized beam splitter 40 and is reflected by the light splitting surface 42 to travel in the second direction. Therefore, the projecting direction of projector 100 is changeable by moving the half wavelength plate 50.

Figure 7:
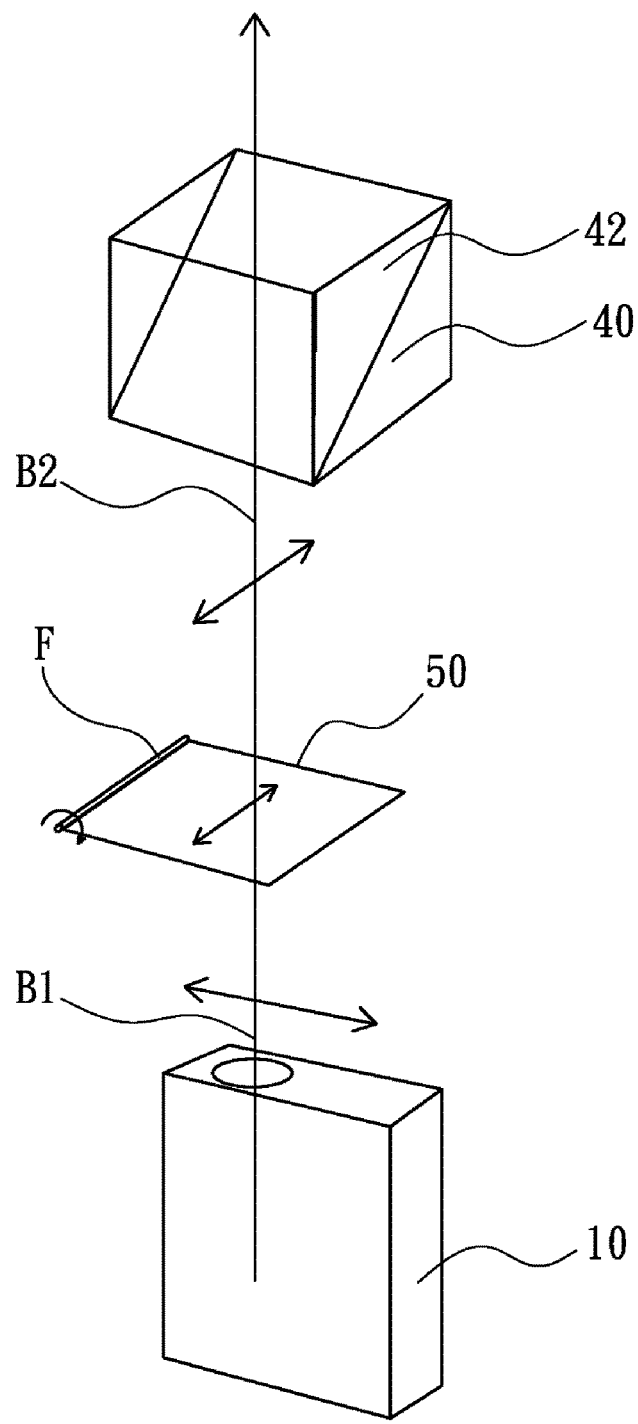
FIGS. 7 and 8 are schematic views of a projector in accordance with another embodiment of the invention.
Figure 8:
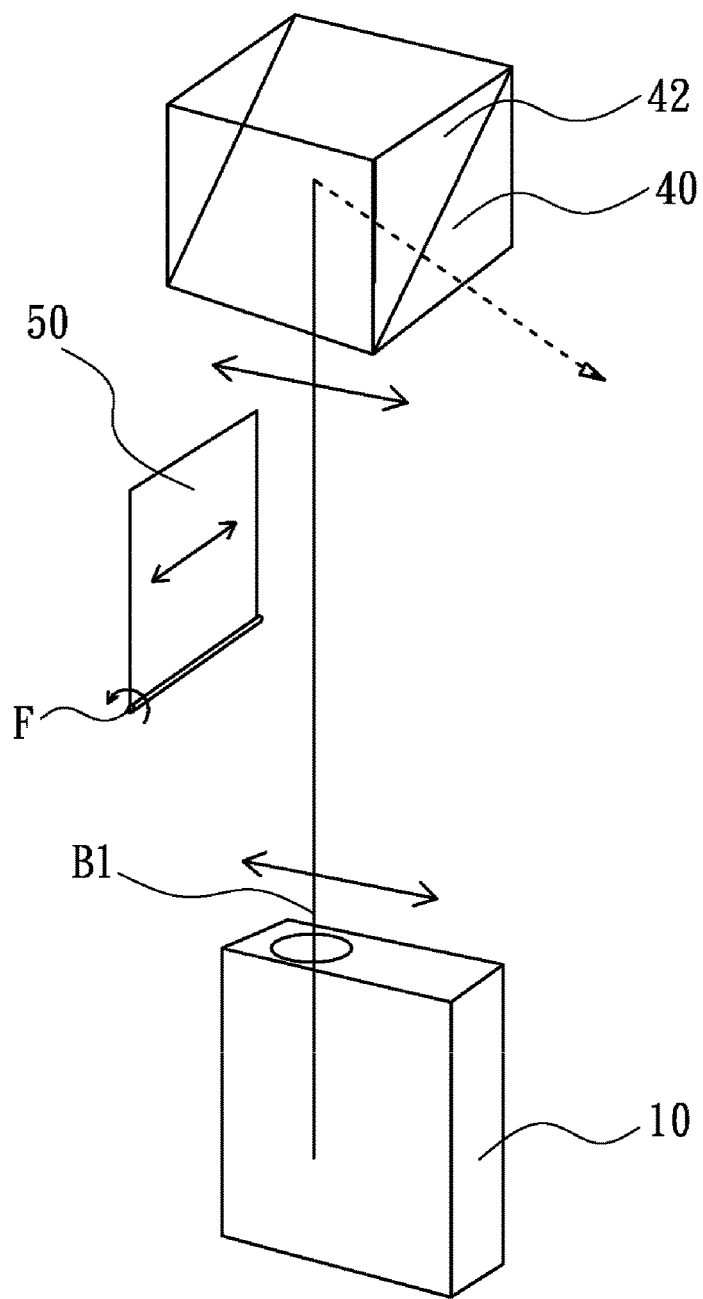

FIGS. 7 and 8 illustrate another embodiment of the projector. The difference between this embodiment and the embodiment of FIGS. 5 and 6 is that the half wavelength plate 50 of this embodiment is rotatably disposed in the traveling path of the first beam B1. As shown in FIG. 7, the half wavelength plate 50 is rotated via a shaft F into the traveling path of the first beam B1. The first beam B1 transforms into the second beam B2 which is a horizontally polarized beam (p-light) when the first beam B1 passes through the half wavelength plate 50. The second beam B2 enters the polarized beam splitter 40, passes through the light splitting surface 42, and is projected in the first direction. To change the projection direction, the half wavelength plate 50 is rotated via the shaft F away from the traveling path of the first beam B1 as shown in FIG. 8. Thus, the first beam B1 does not passes through the half wavelength plate 50 but directly enters the polarized beam splitter 40. The first beam B1 is reflected by the light splitting surface 42 and travels in the second direction. Therefore, the projecting direction of projector 100 is changeable by rotating the half wavelength plate 50.

Figure 9B:
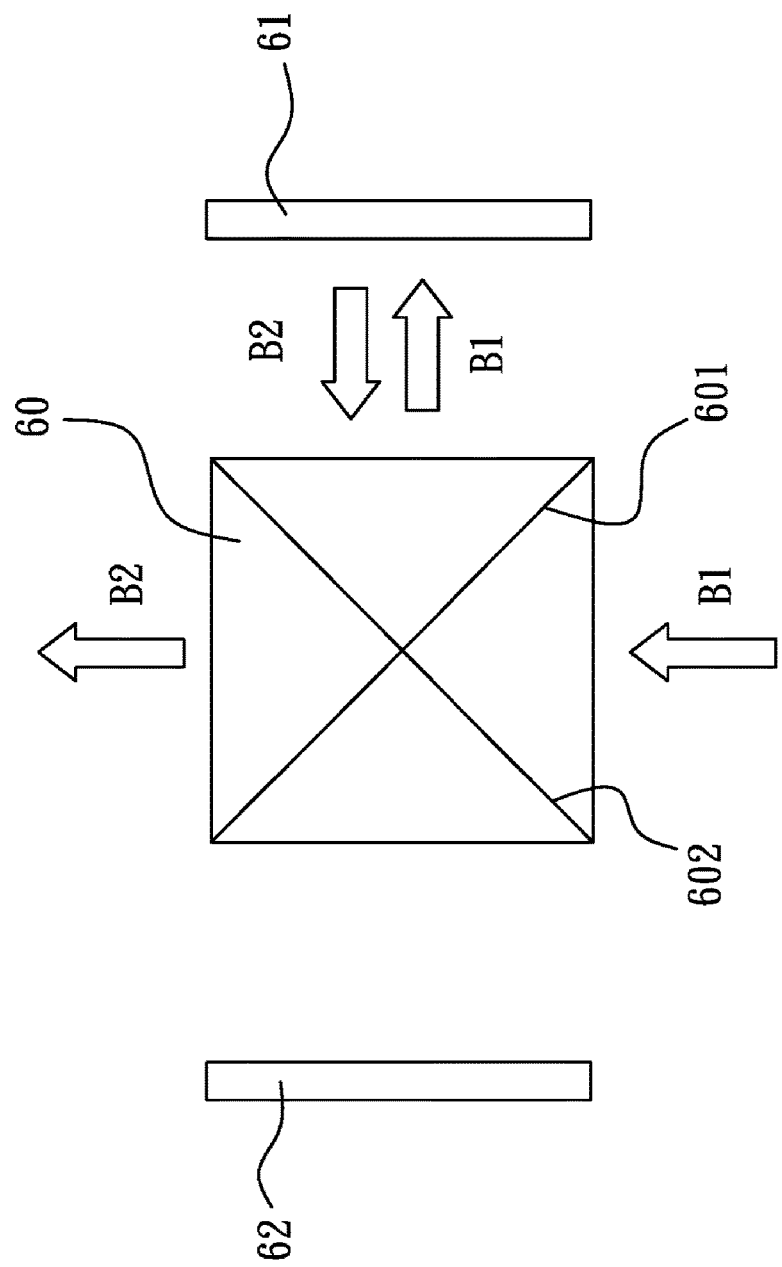

FIGS. 9A and 9B illustrate another embodiment of the polarization changing mechanism. The polarization changing mechanism includes an x-cube 60 and two panels 61, 62. The two panels 61, 62 are positioned respectively at non-adjacent sides of the x-cube 60. Two coatings 601, 602 which are disposed in the x-cube 60 are arranged in a shape of x. The coating 601 allows a horizontally polarized beam (p-light) to pass through and reflects a vertically polarized beam (s-light), while the coating 602 allows a vertically polarized beam (s-light) to pass through and reflects a horizontally polarized beam (p-light).

As shown in FIG. 9A, when the first beam B1 is a vertically polarized beam (s-light) and enters the x-cube 60, the coating 601 reflects the first beam B1 to the panel 62, and the panel 62 transforms the first beam B1 into the second beam B2 and reflects the second beam B2 back to the x-cube 60, wherein the second beam B2 is a horizontally polarized beam (p-light) with image information added therein by the panel 62. Then, the second beam B2 is reflected out of the x-cube 60 by the coating 602. From the above descriptions, it is understood that the first beam B1 entering the polarization changing mechanism of this embodiment transforms into the second beam B2, and the second beam B2 which has image information provided by the panel 62 leaves the polarization changing mechanism.

On the other hand, when the first beam B1 is a horizontally polarized beam (p-light) and enters the x-cube 60, the coating 602 reflects the first beam B1 to the panel 61, and the panel 61 transforms the first beam B1 into the second beam B2 and reflects the second beam B2 back to the x-cube 60, wherein the second beam B2 is a vertically polarized beam (s-light) with image information added therein by the panel 61. Then, the second beam B2 is reflected out of the x-cube 60 by the coating 601. Similarly, the first beam B1 entering the polarization changing mechanism of this embodiment transforms into the second beam B2, and the second beam B2 which has image information provided by the panel 61 leaves the polarization changing mechanism.

It is understood that the projecting direction of projector can be changed by moving the polarization changing mechanism into or out of a space between the light engine 10 and the polarized beam splitter 40.

When a beam simultaneously containing a vertically polarized component and a horizontally polarized component enters the polarization changing mechanism described above, the x-cube 60 splits the beam into two polarized beams. The two panels 61, 62 respectively add different image information into the two polarized beams. Then, the x-cube 60 combines the two polarized beams into a single beam for projection. By this arrangement, the vertically polarized component and horizontally polarized component of the projected beam are provided with different image information.

Figure 10A:
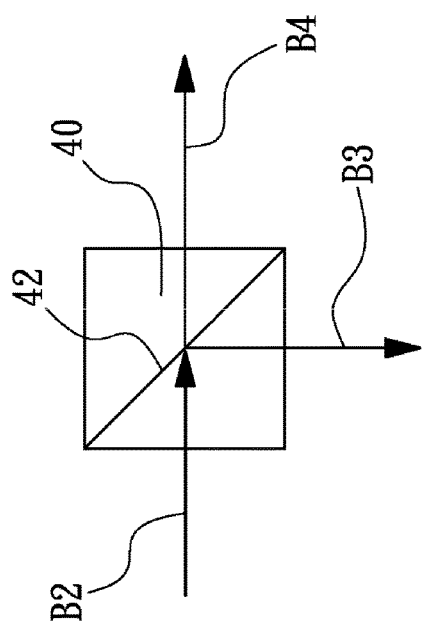
FIG. 10A depicts a beam passing through a polarized beam splitter in accordance with an embodiment of the invention.
Figure 10C:
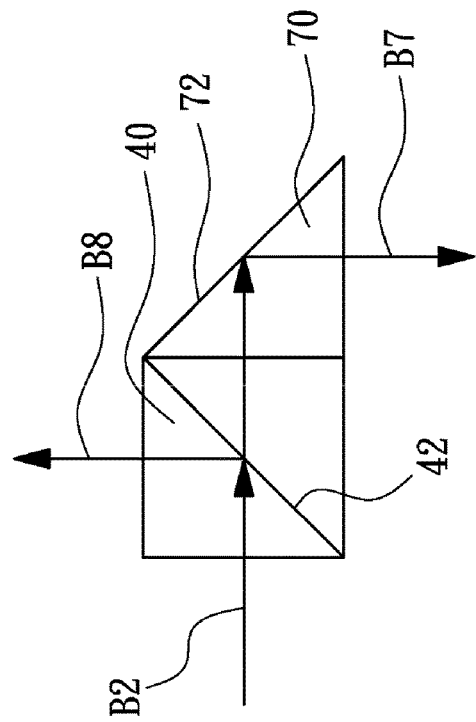
FIG. 10C depicts a beam passing through a polarized beam splitter in accordance with another embodiment of the invention.
Figure 10B:
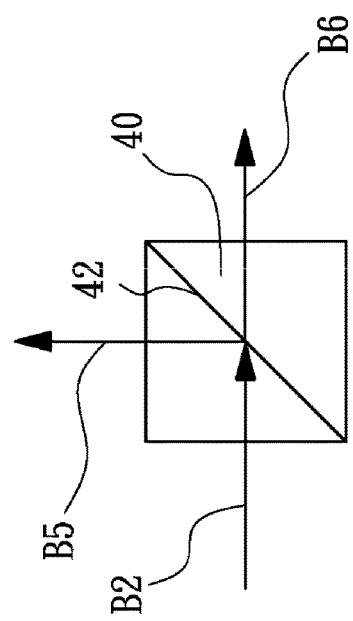
FIG. 10B depicts a beam passing through a polarized beam splitter in accordance with another embodiment of the invention.

FIGS. 10A-10C illustrate several embodiments in which the light splitting surface 42 of the polarized beam splitter 40 is a plane. As shown in FIG. 10A, when the second beam B2 is a circular polarized beam and is incident on the light splitting surface 42, a vertically polarized beam B3 is reflected by the light splitting surface 42 to be projected in the second direction, and a horizontally polarized beam B4 passes through the light splitting surface 42 to be projected in the first direction. It is noted that the first direction is perpendicular to the second direction when the light splitting surface 42 is a plane and is inclined at 45 degrees. In FIG. 10A, since the light splitting surface 42 is faced downwards, the vertically polarized beam B3 is projected downwards. In practical application, the first direction is a forward direction of the projector 100, and the second direction is a downward direction of the projector 100. Therefore, a projector including the polarized beam splitter 40 of FIG. 10A is able to simultaneously project on a wall (or a projection screen) and a top of a desk. In FIG. 10B, the light splitting surface 42 is faced upwards. Thus, a vertically polarized beam B5 is projected upwards (in the second direction), and a horizontally polarized beam B6 is projected forwards (in the first direction). In practical application, therefore, a projector including the polarized beam splitter 40 of FIG. 10B is able to simultaneously project on the wall (or the projection screen) and a ceiling. In FIG. 10C, a reflecting prism 70 which has a reflecting surface 72 (such as a metallic coating) is disposed in front of the polarized beam splitter 40. When the second beam B2 is incident on the light splitting surface 42, a vertically polarized beam B8 is reflected by the light splitting surface 42 to be projected in the second direction, and a horizontally polarized beam B7 passes through the light splitting surface 42 in the first direction, enters the reflecting prism 70 and is reflected by the reflecting surface 72 to travel in a third direction (downward). In practical application, therefore, a projector including the polarized beam splitter 40 of FIG. 10C is able to simultaneously project on the ceiling and a top of a desk.

Figure 11A:
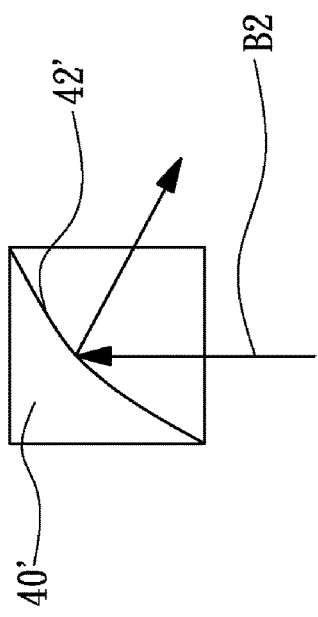
FIG. 11A depicts a beam passing through a polarized beam splitter in accordance with another embodiment of the invention.
Figure 11C:
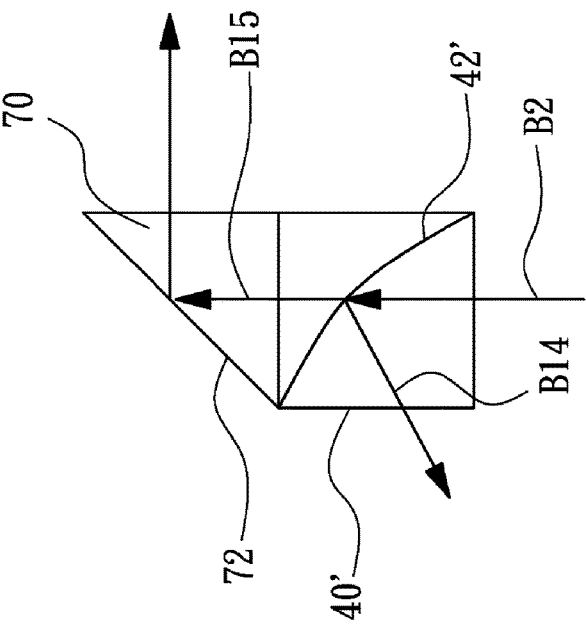
FIG. 11C depicts a beam passing through a polarized beam splitter in accordance with another embodiment of the invention.
Figure 11B:
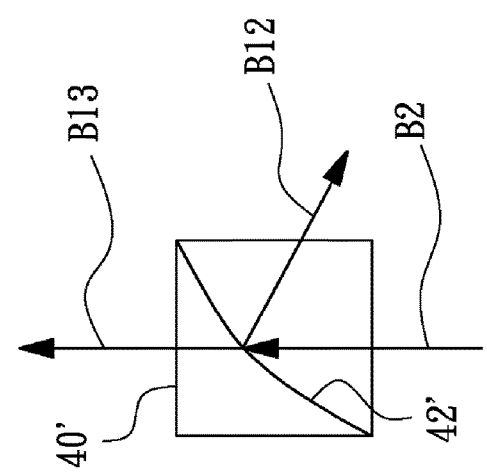
FIG. 11B depicts a beam passing through a polarized beam splitter in accordance with another embodiment of the invention.

FIGS. 11A-11C illustrates other embodiments wherein the light splitting surface 42' of the polarized beam splitter 40' is a curved surface which may be a spherical surface or an aspherical surface. In FIG. 11A, the second beam B2 is a linearly and vertically polarized beam. When incident on the light splitting surface 42', the second beam B2 is reflected by the light splitting surface 42' to travel in the second direction. Because the light splitting surface 42' is a curved surface (specifically, a concave surface), images can be enlarged and projected on a top of a desk in a short distance, similar to a short throw projection. In FIG. 11B, the second beam B2 is a circular polarized beam. When the second beam B2 is incident on the light splitting surface 42', a vertically polarized beam B12 is reflected by the light splitting surface 42' to be projected in the second direction, and a horizontally polarized beam B13 passes through the light splitting surface 42' and is projected in the first direction. The projection of the vertically polarized beam B12 is similar to that of FIG. 11A in which images can be enlarged and projected onto a top of a desk in a short distance, while the horizontally polarized beam B13 can be projected on a wall (or the projection screen). In FIG. 11C, when the second beam B2 is a circular polarized beam and is incident on the light splitting surface 42', a vertically polarized beam B14 is reflected by the light splitting surface 42' to be projected in the second direction, and a horizontally polarized beam B15 passes through the light splitting surface 42' in the first direction (upwards), enters the reflecting prism 70, and is reflected by the reflecting surface 72 to travel in a third direction (rightwards).

As described, the projector 100 of the invention uses movable half or quarter wavelength plates to change the polarization of a beam and controls the projecting direction of projector 100 by introducing different polarized beams to the polarized beam splitting element. Since the projector 100 does not need to provide an additional space for sliding the reflecting element, the miniaturization of the projector 100 becomes easier. In addition, the projector 100 is configured to project respectively in two directions, and therefore the projector 100 becomes more available in practical application.

What is claimed is:

1. A projector, comprising:
   a light engine configured to generate a first polarized beam;
   a polarization changing mechanism which is movable, wherein the first polarized beam is configured to pass or not pass through the polarization changing mechanism, and the first polarized beam transforms into a second polarized beam when the first polarized beam passes through the polarization changing mechanism; and
   a polarized beam splitter having a light splitting surface;
   wherein the first polarized beam enters the polarized beam splitter and is guided by the light splitting surface to travel in a first direction, when the first polarized beam does not pass through the polarization changing mechanism;
   wherein the second polarized beam enters the polarized beam splitter and is guided by the light splitting surface to travel in the first direction or a second direction, when the first polarized beam passes through the polarization changing mechanism and transforms into the second polarized beam.

2. The projector as claimed in claim 1, wherein the second polarized beam entering the polarized beam splitter is split on the light splitting surface to travel respectively in the first and second directions.

3. The projector as claimed in claim 1, wherein the polarization changing mechanism comprises a first quarter wavelength plate and a second quarter wavelength plate, the first polarized beam transforms into the second polarized beam when the first polarized beam passes through the first quarter wavelength plate and the second quarter wavelength plate in order, and the first quarter wavelength plate and the second quarter wavelength plate are rotatable relative to each other.

4. The projector as claimed in claim 3, wherein the first quarter wavelength plate has a first transmission axis, the second quarter wavelength plate has a second transmission axis, a first angle between the first transmission axis and a polarization direction of the first polarized beam is 45 degrees, and a second angle between the first transmission axis and the second transmission axis is 0 degrees, 22.5 degrees, 45 degrees or 180 degrees.

5. The projector as claimed in claim 1, wherein the polarization changing mechanism comprises a half wavelength plate which is movable relative to the light engine and the polarized beam splitter, the first polarized beam transforms into the second polarized beam when the first polarized beam passes through the half wavelength plate, and the first polarized beam enters the polarized beam splitter when the first polarized beam does not pass through the half wavelength plate.

6. The projector as claimed in claim 1, wherein the polarization changing mechanism comprises a half wavelength plate which is rotatable about a shaft, the first polarized beam transforms into the second polarized beam when the first polarized beam passes through the half wavelength plate, and the first polarized beam enters the polarized beam splitter when the first polarized beam does not pass through the half wavelength plate.

7. The projector as claimed in claim 1, wherein the polarized beam splitter comprises a polarized beam splitting prism.

8. The projector as claimed in claim 2, wherein the polarized beam splitter comprises a polarized beam splitting prism.

9. The projector as claimed in claim 3, wherein the polarized beam splitter comprises a polarized beam splitting prism.

10. The projector as claimed in claim 4, wherein the polarized beam splitter comprises a polarized beam splitting prism.

11. The projector as claimed in claim 1, wherein the light splitting surface is a plane, curved surface or aspherical surface.

12. The projector as claimed in claim 6, wherein the first direction is perpendicular to the second direction.

13. The projector as claimed in claim 1, further comprising a reflecting prism which has a reflecting surface, wherein either the first polarized beam or the second polarized beam introduced by the light splitting surface into the reflecting prism is reflected by the reflecting surface to travel in a third direction.

14. The projector as claimed in claim 1, wherein the polarization changing mechanism comprises an x-cube and two panels, and the two panels are positioned respectively at nonadjacent sides of the x-cube.

15. The projector as claimed in claim 14, wherein the x-cube comprises two coatings which are arranged in a shape of x, one coating allows a horizontally polarized beam to pass through and reflects a vertically polarized beamt, and the other coating allows the vertically polarized beam to pass through and reflects the horizontally polarized beam.

16. A projector, comprising:
a light engine configured to generate a first polarized beam;
a polarization changing mechanism which is movable and comprises a first quarter wavelength plate and a second quarter wavelength plate, wherein the first quarter wavelength plate and the second quarter wavelength plate are rotatable relative to each other; and
a polarized beam splitter having a light splitting surface;
wherein the first polarized beam transforms into a second polarized beam when the first polarized beam passes through the first quarter wavelength plate and the second quarter wavelength plate in order;
wherein the second polarized beam enters the polarized beam splitter and is guided by the light splitting surface to travel in a first direction or a second direction.

17. A projector, comprising:
a light engine configured to generate a first polarized beam;
a polarization changing mechanism which is movable and comprises a first quarter wavelength plate having a first transmission axis and a second quarter wavelength plate having a second transmission axis; and
a polarized beam splitter having a light splitting surface;
wherein the first polarized beam transforms into a second polarized beam when the first polarized beam passes through the first quarter wavelength plate and the second quarter wavelength plate in order;
wherein a first angle between the first transmission axis and a polarization direction of the first polarized beam is 45 degrees;
wherein the second polarized beam enters the polarized beam splitter and is guided by the light splitting surface to travel in a first direction or a second direction when a second angle between the first transmission axis and the second transmission axis is 0 degrees, 22.5 degrees, 45 degrees or 180 degrees.

* * * * *